(12) United States Patent
Liu et al.

(10) Patent No.: US 10,872,170 B2
(45) Date of Patent: Dec. 22, 2020

(54) BLOCKCHAIN-BASED COPYRIGHT DISTRIBUTION

(71) Applicant: Advanced New Technologies Co., Ltd., George Town (KY)

(72) Inventors: Lindong Liu, Hangzhou (CN); Jiayin Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/803,262

(22) Filed: Feb. 27, 2020

(65) Prior Publication Data

US 2020/0193064 A1   Jun. 18, 2020

Related U.S. Application Data

(63) Continuation of application No. PCT/CN2020/070831, filed on Jan. 8, 2020.

(30) Foreign Application Priority Data

May 15, 2019 (CN) .......................... 2019 1 0404675

(51) Int. Cl.
*H04L 29/06* (2006.01)
*G06F 21/64* (2013.01)
(Continued)

(52) U.S. Cl.
CPC .............. *G06F 21/64* (2013.01); *G06N 20/00* (2019.01); *G06Q 20/1235* (2013.01); *H04L 9/0637* (2013.01)

(58) Field of Classification Search
CPC .... G06N 20/00; G06Q 20/1235; G06F 21/10; G06F 21/105; H04L 9/0637
See application file for complete search history.

(56) References Cited

U.S. PATENT DOCUMENTS 9,849,364 B2 * 12/2017 Tran .................... H04L 67/12
10,121,143 B1 * 11/2018 Madisetti ............ H04L 9/3239
(Continued)

FOREIGN PATENT DOCUMENTS

| CN | 106250721 | 12/2016 |
|----|-----------|---------|
| CN | 106682457 | 5/2017  |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Hosuk Song
(74) *Attorney, Agent, or Firm* — Fish & Richardson P.C.

(57) ABSTRACT

This disclosure relates to blockchain-based copyright distribution. In one aspect, a method includes receiving, by a node device of a blockchain network, a target transaction including design data of a target work and an identity of a target copyright user corresponding to the target work. Design similarity comparison logic and copyright distribution logic are executed. The design data of the target work is compared with the design data of the existing work stored in the first smart contract to obtain a target similarity between the target work and the existing work. A copyright for the target work is distributed between the target copyright user and a copyright user corresponding to the existing work based on the target similarity. Copyright distribution data that specifies distribution of the copyright between the target copyright user and the copyright user corresponding to the existing work is stored in the first smart contract.

18 Claims, 2 Drawing Sheets

(51) Int. Cl.
  *G06N 20/00*   (2019.01)
  *G06Q 20/12*   (2012.01)
  *H04L 9/06*    (2006.01)

(56) References Cited

U.S. PATENT DOCUMENTS

| | | | |
|---|---|---|---|
| 10,135,607 B1 * | 11/2018 | Roets | G06Q 20/02 |
| 10,176,308 B2 * | 1/2019 | Mintz | H04L 9/0637 |
| 10,581,805 B2 * | 3/2020 | Simons | H04L 63/0281 |
| 2018/0068091 A1 | 3/2018 | Gaider et al. | |
| 2020/0007513 A1 * | 1/2020 | Gleichauf | H04L 63/0428 |

FOREIGN PATENT DOCUMENTS

| | | |
|---|---|---|
| CN | 107086920 | 8/2017 |
| CN | 108805707 | 11/2018 |
| CN | 109493259 | 3/2019 |
| CN | 110264351 | 9/2019 |
| TW | M565853 | 8/2018 |

OTHER PUBLICATIONS

Nakamoto, "Bitcoin: A Peer-to-Peer Electronic Cash System," www.bitcoin.org, 2005, 9 pages.
International Search Report and Written Opinion in PCT Appln No. PCT/CN2020/070831, dated Mar. 27, 2020, 19 pages (with English translation).

* cited by examiner

BLOCKCHAIN-BASED COPYRIGHT DISTRIBUTION

CROSS-REFERENCE TO RELATED APPLICATIONS

This application is a continuation of PCT Application No. PCT/CN2020/070831, filed on Jan. 8, 2020, which claims priority to Chinese Patent Application No. 201910404675.5, filed on May 15, 2019, and each application is hereby incorporated by reference in its entirety.

TECHNICAL FIELD

The present specification relates to the field of data processing technologies, and in particular to, blockchain-based copyright distribution.

BACKGROUND

Blockchain technology, also referred to as a distributed ledger technology, is a new technology in which several computing devices participate in "accounting" to maintain a complete distributed database. Blockchain technology has been widely used in many fields because of its features such as decentralization, openness and transparency, and participation of each computing device in recording data in a database, and fast data synchronization between computing devices.

SUMMARY

In view of this, one or more implementations of the present specification provide blockchain-based copyright distribution methods, devices, computer devices, systems, and computer readable storage media.

To achieve the above objectives, one or more implementations of the present specification provide a blockchain-based copyright distribution method, where the method is applied to a blockchain network including a copyright distribution platform node device and a user client, and the copyright distribution platform node device communicates with the user client; and the method includes: receiving, by the node device of the blockchain network, a target transaction, where the target transaction includes design data of a target work and an identity of a target copyright user corresponding to the target work; and invoking a first smart contract, executing design similarity comparison logic and copyright distribution logic that are declared by the first smart contract, comparing the design data of the target work with the design data of an existing work stored in the first smart contract to obtain the target similarity, and distributing the copyright of the target work between the target copyright user and the copyright user corresponding to the existing work based on the target similarity.

In yet another illustrated implementation, comparing the design data of the target work with the design data of an existing work stored in the first smart contract to obtain a target similarity includes: obtaining at least one target design characteristic value of the target work based on the design data of the target work and a preset design rule; obtaining at least one existing design characteristic value of the existing work based on the design data of the existing work and the preset design rule; and comparing the at least one target design characteristic value with the at least one existing design characteristic value to obtain the target similarity.

In yet another illustrated implementation, comparing the design data of the target work with the design data of an existing work stored in the first smart contract to obtain a target similarity includes: calculating, based on an unsupervised machine learning algorithm, the similarity between the design data of the target work and the design data of the existing work to obtain the target similarity.

In yet another illustrated implementation, performing the copyright distribution of the target work between the target copyright user and the copyright user corresponding to the existing work based on the target similarity includes: when the target similarity is greater than a preset threshold, distributing the copyright of the target work between the target copyright user and a copyright user corresponding to the existing work based on a preset ratio; or when the target similarity is less than the preset threshold, distributing the copyright of the target work to the target copyright user.

In yet another illustrated implementation, the method further includes: receiving a target income transaction, where the target income transaction includes a first quantity of virtual resources that the user pays for using the target work; and invoking the first smart contract, executing the logic of virtual resource distribution based on the copyright distribution of the target work that is declared by the first smart contract, and distributing a second quantity of virtual resources to the target copyright user and the copyright user corresponding to the existing work.

In yet another illustrated implementation, the method further includes: receiving a target income transaction, where the target income transaction includes a first quantity of virtual resources that the user pays for using the target work; and invoking a second smart contract, executing the invoking logic of the first smart contract that is declared by the second smart contract, and distributing a second quantity of virtual resources to the target copyright user and the copyright user corresponding to the existing work based on the copyright distribution of the target work executed by the first smart contract.

In yet another illustrated implementation, the virtual resource includes a digital asset circulated on the blockchain or a digital token corresponding to an off-chain asset.

In yet another implementation shown, the first quantity is not less than the second quantity.

In yet another illustrated implementation, the blockchain is a consortium blockchain, and the copyright distribution platform node device is a consortium member node device; and the target transaction is sent by the copyright distribution platform node device to a distributed database in the blockchain network.

In yet another illustrated implementation, the method further includes: receiving a copyright ownership referendum transaction sent by the copyright distribution platform node device, where the copyright ownership referendum transaction includes a plurality of copyright users corresponding to the design data of the target work; and invoking the first smart contract, executing the copyright ownership voting logic declared by the first smart contract, receiving, within a preset period, a voting transaction sent by a voting user, and distributing copyright of the target work to the plurality of copyright users based on the voting transaction.

Correspondingly, the present application further provides a blockchain-based copyright distribution device, where the device is applied to a blockchain network including a copyright distribution platform node device and a user client, and the copyright distribution platform node device is communicatively connected to the user client; and the device is applied to a node device end of the blockchain and includes: a receiving unit, configured to receive a target transaction, where the target transaction includes design data of a target work and an identity of a target copyright user corresponding to the target work; and an execution unit, configured to: invoke a first smart contract, execute design similarity comparison logic and copyright distribution logic that are declared by the first smart contract, compare the design data of the target work with the design data of an existing work stored in the first smart contract to obtain the target similarity, and distribute the copyright of the target work between the target copyright user and the copyright user corresponding to the existing work based on the target similarity.

In yet another illustrated implementation, comparing the design data of the target work with the design data of an existing work stored in the first smart contract to obtain a target similarity includes: obtaining at least one target design characteristic value of the target work based on the design data of the target work and a preset design rule; obtaining at least one existing design characteristic value of the existing work based on the design data of the existing work and the preset design rule; and comparing the at least one target design characteristic value with the at least one existing design characteristic value to obtain the target similarity.

In yet another illustrated implementation, comparing the design data of the target work with the design data of an existing work stored in the first smart contract to obtain a target similarity includes: calculating, based on an unsupervised machine learning algorithm, the similarity between the design data of the target work and the design data of the existing work to obtain the target similarity.

In yet another illustrated implementation, performing the copyright distribution of the target work between the target copyright user and the copyright user corresponding to the existing work based on the target similarity includes: when the target similarity is greater than a preset threshold, distributing the copyright of the target work between the target copyright user and a copyright user corresponding to the existing work based on a preset ratio; or when the target similarity is less than the preset threshold, distributing the copyright of the target work to the target copyright user.

In yet another illustrated implementation, the receiving unit is further configured to receive a target income transaction, where the target income transaction includes a first quantity of virtual resources that the user pays for using the target work; and the execution unit is further configured to: invoke the first smart contract, execute the logic of virtual resource distribution based on the copyright distribution of the target work declared by the first smart contract, and distribute a second quantity of virtual resources to the target copyright user and the copyright user corresponding to the existing work.

In yet another illustrated implementation, the receiving unit is further configured to receive a target income transaction, where the target transaction including a first quantity of virtual resources that the user pays for using the target work; and the execution unit is further configured to: invoke a second smart contract, execute the invoking logic of the first smart contract declared by the second smart contract, and distribute a second quantity of virtual resources to the target copyright user and the copyright user corresponding to the existing work based on the copyright distribution of the target work executed by the first smart contract.

In yet another illustrated implementation, the virtual resource includes a digital asset circulated on the blockchain or a digital token corresponding to an off-chain asset.

In yet another implementation shown, the first quantity is not less than the second quantity.

In yet another illustrated implementation, the blockchain is a consortium blockchain, and the copyright distribution platform node device is a consortium member node device; and the target transaction is sent by the copyright distribution platform node device to a distributed database in the blockchain network.

In yet another illustrated implementation, the receiving unit is further configured to receive a copyright ownership referendum transaction sent by the copyright distribution platform node device, where the copyright ownership referendum transaction includes a plurality of copyright users corresponding to the design data of the target work; and the execution unit is further configured to: invoke the first smart contract, execute the copyright ownership voting logic declared by the first smart contract, receive, within a preset period, a voting transaction sent by a voting user, and distribute a copyright of the target work to the plurality of copyright users based on the voting transaction.

Correspondingly, one or more implementations of the present specification further provide a computer device, including a storage device and a processor, where the storage device stores a computer program that can be run by the processor; and when the processor runs the computer program, the previous blockchain-based copyright distribution method performed by the node device of the blockchain network is performed.

Correspondingly, one or more implementations of the present specification further provide a computer readable storage medium, where the medium stores a computer program; and when the computer program is run by a processor, the previous blockchain-based copyright distribution method performed by a node device of the blockchain network is performed.

As can be seen from the previous technical solutions, according to the blockchain-based copyright distribution method and device, the computer device, and the computer readable storage medium provided in the present specification, based on a blockchain consensus mechanism, by using the design similarity comparison logic and copyright distribution logic declared by the first smart contract, the copyright of the target works can be conveniently and quickly distributed between an author of a target work and an author of an existing work that is similar to the target work.

DESCRIPTION OF IMPLEMENTATIONS

Figure 1:
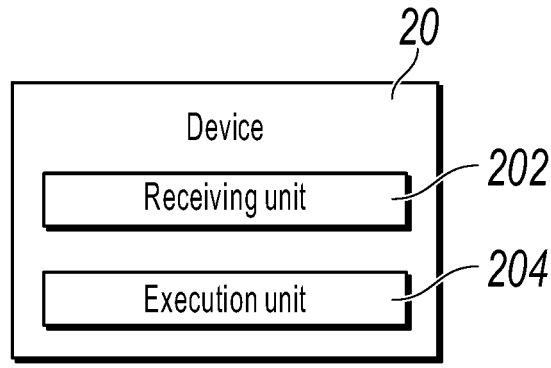
FIG. 1 is a schematic flowchart illustrating a blockchain-based copyright allocation method, according to an implementation of the present specification.

Example implementations are described in detail here, and examples of the example implementations are presented in the accompanying drawings. When the following description relates to the accompanying drawings, unless specified otherwise, same numbers in different accompanying drawings represent a same or similar elements. Implementations described in the following example implementations do not represent implementations consistent with one or more implementations of the present specification. On the contrary, they are only examples of devices and methods that are described in the appended claims in detail and that are consistent with some aspects of one or more implementations of the present specification.

It is worthwhile to note that, in other implementations, the steps of corresponding methods are not necessarily performed in an order shown and illustrated in the present specification. In some other implementations, the method may include more or fewer steps than those described in the present specification. In addition, a single step described in the present specification may be decomposed into a plurality of steps in other implementations for description; and a plurality of steps described in the present specification may be combined into a single step in other implementations for description.

In the traditional design field, masters or outstanding designers create design styles, and other designers learn, imitate or even copy these graphic styles in their paintings or designs. This harms the interests of the original creators. In particular, when the imitators make profits by imitating the products, it is difficult to perform regulation and redistribution of the profits. In addition, it is difficult to identify an infringement because this requires lots of time and money. The previous problem leads to unfairness in identifying original status of the original creators and unfairness in profit distribution.

To resolve the previous problem, one or more implementations of the present specification provide a blockchain-based copyright distribution method, where the method is applied to a blockchain network including a copyright distribution platform node device and a user client.

The blockchain network described in one or more implementations of the present specification may specifically refer to a P2P network system that is formed by nodes based on a consensus mechanism and that has a distributed data storage structure. In the blockchain network, data is distributed in consecutive "blocks", each block includes a data digest of a previous block, and data of all or some of the nodes is backed up, depending on a specific consensus mechanism (for example, POW, POS, DPOS, or PBFT). A person skilled in the art knows that, because the blockchain network system runs under the corresponding consensus mechanism, it is difficult for any node to tamper with the data recorded in the blockchain database. For example, for the blockchain based on the POW consensus mechanism, at least 51% of the computing capability of the entire network is required to launch an attack to tamper with the existing data. Therefore, the blockchain system has incomparable data security and tamper-resistance features over other centralized database systems. Therefore, the data recorded in the distributed database in the blockchain network will not be attacked or tampered with, thereby ensuring the real reliability of the data information stored in the distributed database in the blockchain network.

Example types of the blockchain network can include a public blockchain network, a private blockchain network, and a consortium blockchain network. Although the term "blockchain" is often associated with a bitcoin cryptocurrency network, the blockchain used herein may refer to a distributed ledger system (DLS) that is not based on any particular use case.

In a public blockchain network, the consensus process is controlled by nodes in a consensus network. For example, hundreds, thousands and even millions of entities can collaborate in the public blockchain network, and each entity operates at least one node in the public blockchain network. Therefore, the public blockchain network can be considered as a public network of participating entities. Example public chunk networks include a bitcoin network, which is a peer-to-peer payment network. The bitcoin network uses a distributed ledger, which is called a blockchain. However, as stated above, the term "blockchain" is often used to refer to a distributed ledger that is not based on a specific bitcoin network.

Generally, the public blockchain network supports public transactions. A public transaction is shared among all nodes in the public blockchain network and stored in a global blockchain. The global blockchain is a blockchain that can perform duplication across all nodes. That is, for the global blockchain, all nodes are in a fully consistent state. To reach a consensus (for example, agreeing to add a block to the blockchain), a consensus protocol is implemented in the public blockchain network. Example consensus protocols include, but are not limited to, proof of work (POW) implemented in the bitcoin network.

Generally, a private blockchain network is provided to a particular entity, and the particular entity centrally controls read and write permissions. The entity controls which nodes can participate in the blockchain network. Therefore, the private blockchain network is usually called a grant-based network, which limits the participants of the network and the participation levels of the participants (for example, only participating in some transactions). In the private blockchain network, various access control mechanisms can be used (for example, voting, by existing participants, on adding an entity, or performing access control by a monitoring organization).

Generally, a consortium blockchain network is private among network participants. In a consortium blockchain network, the consensus process is controlled by a group of authorized nodes (consortium member nodes), and one or more nodes are operated by a corresponding entity (for example, an enterprise). For example, a consortium formed by several entities (for example, 10 enterprises) can operate the consortium blockchain network, and each entity operates at least one node in the consortium blockchain network. Therefore, the consortium blockchain network can be considered as a private network of participating entities. In some examples, all entities (nodes) need to add signatures on each block to make the block valid, and add the valid block to the blockchain. In some examples, at least a subset of the entities (nodes) (for example, at least seven entities) need to add signatures on each block to make the block valid, and add the valid block to the blockchain.

It can be anticipated that the implementations of the present specification can be implemented in any suitable blockchain network.

The node (or node device) described in one or more implementations of the present specification refers to a node that can be added to the blockchain by following a corresponding node protocol and running a program of the node protocol, so that the node serves as a node of the blockchain. A person skilled in the art usually refers to a node device with a full backup of data in a blockchain distributed database as a full node, and refers to a node device with a partial backup of data in a blockchain distributed database (for example, data with only a block header) as a lightweight node. In one or more implementations of the present specification, the node type of the previous copyright distribution platform node device is not limited.

The copyright distribution platform described in one or more implementations of the present specification is used to receive works or work-related design data that is provided by the platform user and distribute the copyrights of the works. The works described in the present specification include design works such as pictures, writing works, and audio and video works. Based on originality of a target work (whether or not similar to a composition style of an existing work) provided by a platform user, the platform user can obtain a certain ratio of the copyright of the target work on the platform, or obtain the right to gain profits from the use of the target works based on the previous ratio.

In one or more implementations of the present specification, an entity of the platform user can be added to the blockchain network by running a client installation program on a terminal, where the client installation program may be an installation program of a node device of a blockchain network. Correspondingly, the user client also serves as the node device of the blockchain network, initiates a data acquisition request to its adjacent node device (such as the copyright distribution platform node device) when backing up a copy of the blockchain, or publishes data to the blockchain by broadcasting data to its adjacent node device. Alternatively, the previous client installation program may be an access-controlled blockchain client connected to a consortium member node device (such as the previous copyright distribution node device) in the consortium blockchain. Correspondingly, because the client does not have the right to directly access the distributed database in the blockchain network, the client does not generally serve as a node of the previous blockchain network, and the client needs to send, to one or more consortium member nodes connected to the client, data requests for identifying permissions. The present specification does not limit whether the previous user client is a node device of the blockchain network. As described above, regardless of whether the client is a blockchain node device or a client device of a consortium member node, data stored in a distributed database in the blockchain network may be obtained through a communication connection to the copyright distribution node device, or sent to the distributed database in the blockchain network through a communication connection to the copyright distribution node device.

As shown in FIG. 1, in an implementation of a blockchain-based copyright distribution method provided in the present specification, the method includes the following steps.

Step 102: A node device of a blockchain network receives a target transaction, where the target transaction includes design data of a target work and an identity of a target copyright user corresponding to the target work.

It is worthwhile to note that the transaction described in the present specification refers to a group of data that is created by a user through a blockchain network and that needs to be finally sent to a distributed database in the blockchain network. A transaction in the blockchain has a narrow sense and a broad sense. A transaction in a narrow sense refers to a value transfer initiated to a user to the blockchain. For example, in a conventional bitcoin blockchain network, a transaction can be a transfer initiated by a user in the blockchain. In the broad sense, a transaction refers to service data that the user entity publishes to the blockchain through the node.

The target transaction described in this implementation may include design data of a target work and an identity of a target copyright user corresponding to the target work. The target copyright user may be a designer of the target work, a copyright owner of the target work, or an owner of the profits of the target work. There may be one or more target copyright users. The identity of the target copyright user may include a unique identity such as an account address, a public key, or a CA certificate number the target copyright user in the previous blockchain network or an identity card number of the target copyright user. This is not limited in the present specification. It is worthwhile to note that the design data of the previous target works may be the target works themselves, such as literary works, design works, or video or audio works, or may be the design characteristic data which reflect the originality of the target works, such as a circular angle value, a stroke thickness value, a size value, or a color number/pigment value.

The present implementation does not limit the identity of a sender of the previous target transaction. As described above, when the user client serves as a node device of the blockchain network, the user client may directly send the target transaction to the blockchain network, and record the target transaction into the distributed database in the blockchain network after the consensus verification of the blockchain. In still another illustrated implementation, the blockchain described in the previous implementation is a consortium blockchain, and the previous copyright distribution platform node device is a consortium member node; the user client is communicatively connected to the node device of the copyright distribution platform as the user end of the previous copyright distribution platform. After sending the design data of the target work to the previous copyright distribution platform, the user adds the design data and the identity of the target copyright user to target transaction, and sends the target transaction to the blockchain network.

Compared with the implementation of sending the target transaction to the blockchain by the platform node device after collecting user client information, in the implementation of sending the target transaction directly to the blockchain by the client, the process is simplified and the data is more authentic. However, the hardware requirement on the client is high, and because the data is not processed by a platform, the space of the distributed database of the blockchain may be wasted because some invalid data is sent. A person skilled in the art can build a blockchain mode (such as a consortium blockchain mode) in accordance with the actual service model, and assign corresponding participant permissions to the user client.

Step 104: Invoke a first smart contract, execute design similarity comparison logic and copyright distribution logic that are declared by the first smart contract, compare the design data of the target work with the design data of the first work stored in the distributed database in the blockchain network to obtain the first target similarity, and distribute the copyright of the target work between the target copyright user and the first user corresponding to the first work based on the first target similarity.

To further provide the context of the implementations of the present specification, in a blockchain network, applications can be developed, tested, and deployed for execution in the blockchain network. Example applications can include but are not limited to a smart contract. A smart contract can be described as a digital representation of a real-world legal contract with contractual terms that affect the parties. The smart contract is implemented, stored, updated (as required), and executed within the blockchain network. Contract parties associated with a smart contract (for example, a buyer and a seller) may be represented as nodes in the blockchain network.

In some examples, a smart contract can store data that can be used to record information, facts, associations, balances, and any other information needed to implement contract execution logic. A smart contract can be described as a computer executable program formed by functions, where instances of the smart contract can be created, and functions can be invoked to execute the logic declared by the smart contract.

In terms of technology, a smart contract can be implemented based on object and object-oriented classes. For example, the terms and components of a smart contract can be represented as objects processed by an application program that implements the smart contract. A smart contract (or an object in a smart contract) can invoke another smart contract (or another object in the same smart contract) like other object-oriented objects. For example, invocation performed by an object can be invocation for creating, updating, deleting, or communicating with an object of another class. Invocation between objects can be implemented by functions, methods, application programming interfaces (APIs), or other invocation mechanisms. For example, a first object can invoke a function to create a second object.

Therefore, based on the previous description of the smart contract, the target transaction described in one or more implementations of the present specification as a transaction invoked by the first smart contract may further include other parameters such as the address of the invoking first smart contract or the name of the invoked or executed logical function. Details are omitted here for simplicity. By invoking the first smart contract, the design data of the target work and the data information such as the identity of the target copyright user are also stored in the first smart contract.

The design data of an existing work described in the previous implementation is stored in the previous first smart contract based on the transaction invoked by previously completed first smart contract, and a quantity of the previous existing works is not limited. The first smart contract compares the design data of the target work with the design data of an existing work stored in the first smart contract to obtain the target similarity. Correspondingly, the target similarity may be one target similarity obtained by comparing the design data of the target work with the design data of one similar existing work, or may be a plurality of target similarities obtained by comparing the design data of the target work with the design data of a plurality of similar existing works.

A person skilled in the art can design the previous similarity comparison logic based on an actual representation of the target work or a specific service application scenario. For example, in the UI design industry, the design rules and design characteristic values of icon elements are generally specified. The design rules include the design sizes of icon elements, the quantity of layers, the size of outline lines, etc., and several design characteristic values that can reflect the design originality of the icon elements are extracted, such as point/line dimensions, circular angle radians, corner angles, pigment values, contrast, etc. The first smart contract may obtain at least one design characteristic value of the previous target works based on the design data and preset design rules of the previous target works; obtain at least one existing design characteristic value of the existing work based on the design data of the existing work and the preset design rule; and compare the at least one target design characteristic value with the at least one existing design characteristic value to obtain at least one target similarity.

For another example, for a music-type audio work, design characteristic values such as beats and rhythms or temperaments and intervals can be obtained based on the design rules of music creation and can be used to compare similarity between the target work and an existing work. For a video work, corresponding design characteristic values can be obtained based on the video plot type, design idea, and performance style and can be used to compare similarity between the target work and an existing work.

The previous design similarity comparison logic is more suitable for works that have clear design rules and whose design characteristic values can be easily obtained. For works that have great openness and strong diversity, whose design rules cannot be easily summarized, and whose design characteristic values cannot be easily obtained, artificial intelligence such as unsupervised machine learning algorithms (for example, generative adversarial network (GAN) can be used to calculate the similarity between the design data of the target work and the design data of the existing work, so that the target similarity can be obtained.

The specific calculation logic of the previous unsupervised machine learning algorithm can be set by a person skilled in the art based on the type of a target work, which is not limited in the present specification.

After the previous target similarity is obtained through calculation, the first smart contract may distribute the copyright of the target work between the target copyright user and the copyright user corresponding to the existing work based on the preset distribution logic. When the target similarity reaches the preset threshold, the copyright user corresponding to the existing work (as an original creator) can have a part of the copyright of the target copyright user (as an imitator); or when the target similarity does not reach the preset threshold, the target copyright user has the full copyright because the target work does not constitute an imitation of the existing work. The distribution ratio of a part of the copyright can be set based on the type of the target work; for example, multi-step distribution logic can be used. For example, when the target similarity reaches the first threshold (95%-100%), the copyright user corresponding to the existing work can obtain 50% of the copyright; or when the target similarity is less than the second threshold (80%), the copyright user corresponding to the existing work do not obtain the copyright of the target works; or when the target similarity is between the first and threshold and the second threshold, the copyright user of the existing work can obtain 20% of the copyright of the target work, etc.

Because the previous first smart contract can be implemented only through consensus verification of the node devices in the blockchain network, the design similarity comparison logic and the copyright distribution logic may be formulated based on industry practices or other general conventions to ensure that the previous logic is fair and reasonable. Compared with the implementation of the copyright distribution logic that is independently formulated and executed by the copyright distribution platform, the design similarity comparison logic and the copyright distribution logic in the blockchain-based copyright distribution method provided in the present specification are more transparent and open, which effectively prevents unfairness caused by internal operations of the platform. In addition, the first smart contract can be executed at any time based on the invocation request, which greatly improves the efficiency of copyright distribution.

The copyright distribution result of the previous target work may be stored in a transaction log in a form of an execution output event of the first smart contract, and stored in the distributed database in the blockchain network. On the basis of the distribution result, the previous target copyright user and the copyright user of the existing work can obtain the right to the usage profits of the target work based on the copyright ratio of the target work.

Therefore, in yet another illustrated implementation, a method for obtaining profits by the target copyright user and the copyright user of the existing work includes: receiving a target income transaction, where the target income transaction includes a first quantity of virtual resources paid by the user for using the target work; invoking a first smart contract, executing the logic of virtual resource distribution based on the copyright distribution of the target work declared by the first smart contract, and distributing a second quantity of virtual resources to the target copyright user and the copyright user corresponding to the existing work.

The virtual resources described in one or more implementations of the present specification may include digital assets circulated on a blockchain, such as digital currencies defined on the blockchain, such as bitcoin and Ethercoin. Alternatively, the virtual resources can also correspond to off-chain assets, such as cash, securities, coupons, and real estates. A person skilled in the art can design a specific representation of the previous virtual resources based on actual service scenario requirements, which is not limited in the present disclosure.

Of course, the profit distribution logic executed by the previous target copyright user and the previous copyright user of an existing work based on the copyright of the target work they enjoy may be executed by another smart contract, such as the second smart contract. Correspondingly, the method for obtaining profit by the target copyright user and the copyright user of the existing work includes: receiving a target income transaction, where the target income transaction includes a first quantity of virtual resources paid by the user by using the target work; invoking the second smart contract, executing the invoking logic of the first smart contract declared by the second smart contract, and distributing a second quantity of virtual resources to the target copyright user and the copyright user corresponding to the existing work based on the copyright distribution of the target work executed by the first smart contract. Through the invocation of the first smart contract by the second smart contract, the existing copyright distribution result of the target work can be obtained, and based on the profit distribution logic declared by the second smart contract, the profits can be distributed the users who enjoy the entire or a part of the copyright of the target work. Compared with the implementation of copyright distribution and profit distribution by the first smart contract, costs for updating and managing the first smart contract can be reduced, and the profit distribution is more flexible.

Both the first smart contract and the second smart contract can be compiled and deployed on the blockchain network by the previous copyright distribution platform, and can be maintained and upgraded by the previous copyright distribution platform. In order to ensure the profitability or cost expenditure of the copyright distribution platform, the previous first quantity may not be less than the previous second quantity.

Based on the block-based copyright distribution method provided by one or more implementations of the present specification, both the existing creator (a target copyright user) of the target work and an existing creator (a copyright user corresponding to the existing work) of the target work can obtain a part of the copyright of the target work, or obtain corresponding profits based on a part of the copyright of the target work. This method not only encourages the original creator, but also analyzes the creative work done by the imitator, and to some extent encourages the creative work done by the imitator. Therefore, this method encourages the efforts and support in creative work.

In the blockchain-based copyright distribution method provided in one or more of the previous implementations, a copyright user corresponding to an existing work is usually determined based on the fact that a time at which an existing work is recorded in a blockchain (or a first smart contract) is earlier than a time at which a target work is recorded. It is worthwhile to note that, in some special cases, for example, when user A publishes design data of a work to the copyright distribution platform one hour ahead of user B, but in fact, the work of user B generates a far larger quantity of views or a far larger amount of transaction value than the work of user A, the previous copyright distribution platform node device can initiate a copyright ownership voting procedure, and publish a copyright ownership referendum transaction to the blockchain, where the copyright ownership referendum transaction includes a plurality of copyright users corresponding to the design data of the target work; and invoke the first smart contract, execute the copyright ownership voting logic declared by the first smart contract, receive, within a preset period, a voting transaction sent by a voting user, and distribute copyright of the target work to the plurality of copyright users based on the voting transaction.

The copyright distribution method in the special case can be used as a supplement to the blockchain-based copyright distribution method provided by one or more of the previous implementations, thereby establishing a fairer and reasonable mechanism for the copyright distribution of the target works.

Corresponding to the previous process implementation, an implementation of the present specification further provides a blockchain-based copyright distribution device 20. The device 20 can be implemented by using software, hardware, or a combination thereof. The software-based implementation is used as an example. As a logic device, the device 20 is formed by reading, by the central processing unit (CPU) in a device where the device 20 is located, corresponding computer program instructions to a memory for running. At the hardware level, in addition to the CPU, memory, and storage device shown in FIG. 3, the device in which the device 20 is located usually includes other hardware such as a chip for transmitting and receiving wireless signals, and/or other hardware such as a board for implementing network communication functions.

Figure 2:
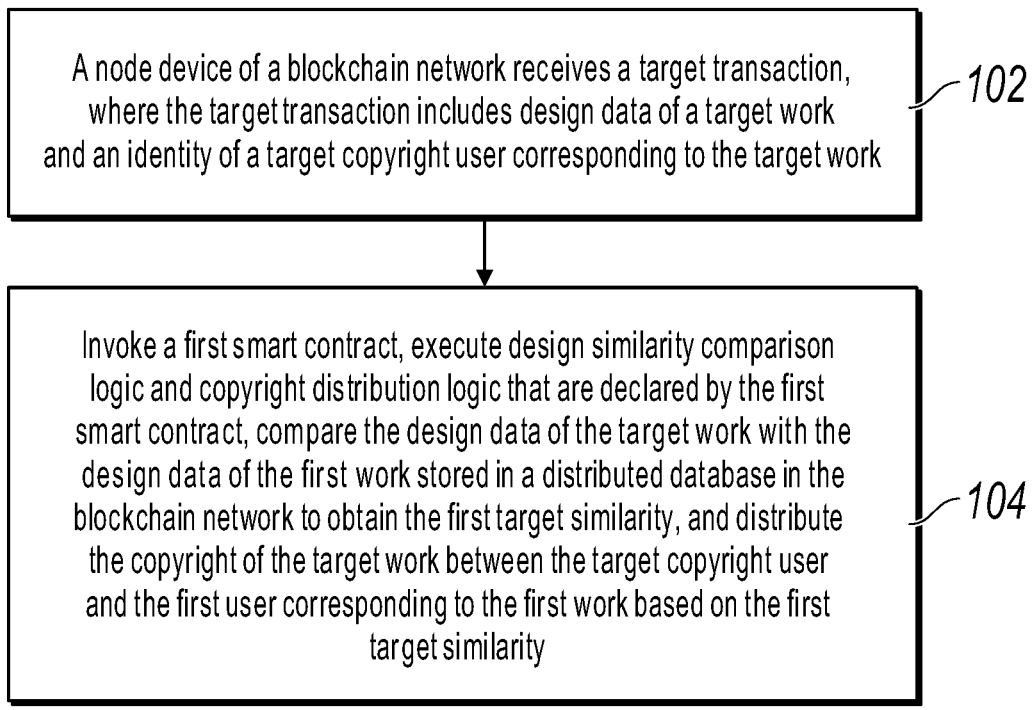
FIG. 2 is a schematic diagram of a blockchain-based copyright distribution device applied to a node device of a blockchain network, according to an implementation of the present specification.

As shown in FIG. 2, the present specification further provides a blockchain-based copyright distribution device 20, where the device 20 is applied to a blockchain network including a copyright distribution platform node device and a user client, and the copyright distribution platform node device is communicatively connected to the user client. The device 20 is applied to a node device of the blockchain network and includes: a receiving unit 202, configured to receive a target transaction, where the target transaction includes design data of a target work and an identity of a target copyright user corresponding to the target work; and an execution unit 204, configured to: invoke a first smart contract, execute design similarity comparison logic and copyright distribution logic that are declared by the first smart contract, compare the design data of the target work with the design data of an existing work stored in the first smart contract to obtain a target similarity, and distribute the copyright of the target work between the target copyright user and the copyright user corresponding to the existing work based on the target similarity.

In yet another illustrated implementation, comparing the design data of the target work with the design data of an existing work stored in the first smart contract to obtain a target similarity includes: obtaining at least one target design characteristic value of the target work based on the design data of the target work and a preset design rule; obtaining at least one existing design characteristic value of the existing work based on the design data of the existing work and the preset design rule; and comparing the at least one target design characteristic value with the at least one existing design characteristic value to obtain the target similarity.

In yet another illustrated implementation, comparing the design data of the target work with the design data of an existing work stored in the first smart contract to obtain a target similarity includes: calculating, based on an unsupervised machine learning algorithm, the similarity between the design data of the target work and the design data of the existing work to obtain the target similarity.

In yet another illustrated implementation, performing the copyright distribution of the target work between the target copyright user and the copyright user corresponding to the existing work based on the target similarity includes: when the target similarity is greater than a preset threshold, distributing the copyright of the target work between the target copyright user and a copyright user corresponding to the existing work based on a preset ratio; or when the target similarity is less than the preset threshold, distributing the full copyright of the target work to the target copyright user.

In yet another illustrated implementation, the receiving unit 202 is further configured to receive a target income transaction, where the target income transaction includes a first quantity of virtual resources that a user pays for using the target work; and the execution unit 204 is further configured to: invoke the first smart contract, execute the logic of virtual resource distribution based on the copyright distribution of the target work declared by the first smart contract, and distribute a second quantity of virtual resources to the target copyright user and the copyright user corresponding to the existing work.

In yet another illustrated implementation, the receiving unit 202 is further configured to receive a target income transaction, where the target transaction includes a first quantity of virtual resources that a user pays for using the target work; and the execution unit 204 is further configured to: invoke a second smart contract, execute the invoking logic of the first smart contract declared by the second smart contract, and distribute a second quantity of virtual resources to the target copyright user and the copyright user corresponding to the existing work based on the copyright distribution of the target work executed by the first smart contract.

In yet another illustrated implementation, the virtual resource includes a digital asset circulated on the blockchain or a digital token corresponding to an off-chain asset.

In yet another implementation shown, the first quantity is not less than the second quantity.

In yet another illustrated implementation, the blockchain is a consortium blockchain, and the copyright distribution platform node device is a consortium member node device; and the target transaction is sent by the copyright distribution platform node device to a distributed database in the blockchain network.

In still another illustrated implementation, the receiving unit 202 is further configured to receive a copyright ownership referendum transaction sent by the copyright distribution platform node device, where the copyright ownership referendum transaction includes a plurality of copyright users corresponding to the design data of the target work; and the execution unit 204 is further configured to: invoke a first smart contract, execute the copyright ownership voting logic declared by the first smart contract, receive, within a preset period, a voting transaction sent by a voting user, and distribute copyright of the target work to the plurality of copyright users based on the voting transaction.

For a detailed implementation process of the functions and purposes of the modules in the device 20, references can be made to the implementation process of the corresponding steps in the method. Details are omitted here for simplicity.

The previous device implementations are merely examples, where the units described as separate parts can or cannot be physically separate, and components displayed as units can or cannot be physical units, can be located in one place, or can be distributed on a plurality of network units. Based on actual requirements, some or all of these modules can be selected to implement the purpose of the present specification. A person of ordinary skill in the art can understand and implement the device without paying creative work.

The devices, units, or modules illustrated in the previous implementations can be implemented by computer chips, entities, or products having a certain function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of several of these devices.

Figure 3:
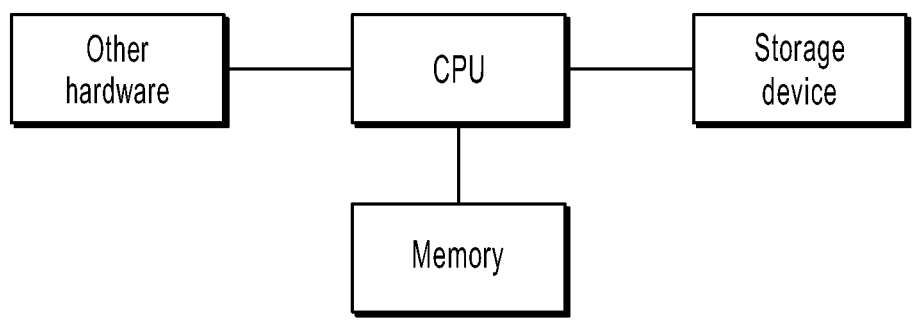
FIG. 3 is a diagram illustrating a hardware structure for running a blockchain-based copyright distribution device, according to an implementation of the present specification.

Corresponding to the previous method implementations, the implementations of the present specification further provide a computer device. As shown in FIG. 3, the computer device includes a storage device and a processor. The storage device stores computer programs that can be run by the processor. When the processor runs the stored computer programs, the steps of the copyright distribution method executed by the node device of the blockchain network in the implementation of the present specification are performed. For a detailed description of the steps of the copyright distribution method performed by the node device of the blockchain network, references can be made to the previous descriptions. Details are omitted here for simplicity.

Corresponding to the previous method implementations, an implementation of the present specification further provides a computer readable storage medium, where the medium stores computer programs; and when the computer programs are run by a processor, the steps of the copyright distribution method executed by the node device of the blockchain network in the present specification implementation are performed. For a detailed description of the steps of the copyright distribution method performed by the node device of the blockchain network, references can be made to the previous descriptions. Details are omitted here for simplicity.

The previous descriptions are merely preferred implementations of one or more implementations of the present specification, and are not intended to limit the present disclosure. Any modification, equivalent replacement, improvement, etc., made without departing from the spirit and principles of the present specification shall fall within the protection scope of the present specification.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is worthwhile to note that terms "include", "comprise" or any other variant is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

A person skilled in the art should understand that the implementations of the present specification can be provided as methods, systems, or computer program products. Therefore, the implementations of the present specification can take a form of hardware implementations, software implementations, or both. Further, the implementations of the present specification can take a form of computer program products implemented on one or more computer-usable storage media (including but not limited to a disk storage device, CD-ROM, and an optical storage device) containing computer-usable program code.

What is claimed is:

1. A computer-implemented blockchain-based copyright distribution method, the method comprising:
   receiving, by a node device of a blockchain network comprising a blockchain, a target transaction comprising design data of a target work and an identity of a target copyright user corresponding to the target work;
   invoking a first smart contract that stores design data of an existing work;
   in response to invoking the first smart contract, executing design similarity comparison logic and copyright distribution logic that are declared by the first smart contract;
   in response to executing the design similarity comparison logic and the copyright distribution logic, comparing the design data of the target work with the design data of the existing work stored in the first smart contract to obtain a target similarity between the target work and the existing work, wherein comparing the design data of the target work with the design data of the existing work stored in the first smart contract to obtain the target similarity comprises:
      obtaining at least one target design characteristic value of the target work based on the design data of the target work and a preset design rule;
      obtaining at least one existing design characteristic value of the existing work based on the design data of the existing work and the preset design rule; and
      comparing the at least one target design characteristic value with the at least one existing design characteristic value to obtain the target similarity;
   distributing a copyright for the target work between the target copyright user and a copyright user corresponding to the existing work based on the target similarity; and
   storing, in the first smart contract, copyright distribution data that specifies distribution of the copyright between the target copyright user and the copyright user corresponding to the existing work.

2. The computer-implemented method of claim 1, wherein comparing the design data of the target work with the design data of the existing work stored in the first smart contract to obtain the target similarity comprises:
   calculating, based on an unsupervised machine learning algorithm, a similarity between the design data of the target work and the design data of the existing work to obtain the target similarity.

3. The computer-implemented method of claim 1, wherein distributing the copyright for the target work between the target copyright user and the copyright user corresponding to the existing work based on the target similarity comprises:
   whenever the target similarity is greater than a preset threshold, distributing the copyright of the target work between the target copyright user and the copyright user corresponding to the existing work based on a preset ratio; and
   whenever the target similarity is less than the preset threshold, distributing an entirety of the copyright of the target work to the target copyright user.

4. The computer-implemented method of claim 1, further comprising:
   receiving a target income transaction comprising a first quantity of virtual resources that a user provides for using the target work; and
   invoking the first smart contract;
   in response to invoking the first smart contract:
      executing logic of virtual resource distribution based on the copyright distribution data stored by the first smart contract; and
      distributing a second quantity of virtual resources to the target copyright user and the copyright user corresponding to the existing work based on the copyright distribution data.

5. The computer-implemented method of claim 4, wherein the virtual resources comprise digital assets circulated on the blockchain or digital tokens corresponding to off-chain assets.

6. The computer-implemented method of claim 4, wherein the first quantity is not less than the second quantity.

7. The computer-implemented method of claim 1, further comprising:

receiving a target income transaction comprising a first quantity of virtual resources that a user provides for using the target work; and invoking a second smart contract;
 executing invoking logic of the first smart contract that is declared by the second smart contract; and
 distributing a second quantity of virtual resources to the target copyright user and the copyright user corresponding to the existing work based on the copyright distribution data.

8. The computer-implemented method of claim 1, wherein:
the blockchain network comprises a copyright distribution platform node device, and a user client device;
the copyright distribution platform node device communicates with the user client device;
the blockchain is a consortium blockchain;
the copyright distribution platform node device is a consortium member node device; and the target transaction is sent by the copyright distribution platform node device to a distributed database in the blockchain network.

9. The computer-implemented method of claim 8, further comprising:
receiving a copyright ownership referendum transaction sent by the copyright distribution platform node device, wherein the copyright ownership referendum transaction comprises a plurality of copyright users corresponding to the design data of the target work; and
invoking the first smart contract;
executing copyright ownership voting logic declared by the first smart contract;
receiving, within a preset period after executing the copyright ownership voting logic, a voting transaction sent by a voting user; and
distributing the copyright for the target work to the plurality of copyright users based on the voting transaction.

10. A non-transitory, computer-readable medium storing one or more instructions executable by a computer system to perform operations comprising:
receiving, by a node device of a blockchain network comprising a blockchain, a target transaction comprising design data of a target work and an identity of a target copyright user corresponding to the target work;
invoking a first smart contract that stores design data of an existing work;
in response to invoking the first smart contract, executing design similarity comparison logic and copyright distribution logic that are declared by the first smart contract;
in response to executing the design similarity comparison logic and the copyright distribution logic, comparing the design data of the target work with the design data of the existing work stored in the first smart contract to obtain a target similarity between the target work and the existing work, wherein comparing the design data of the target work with the design data of the existing work stored in the first smart contract to obtain the target similarity comprises:
 obtaining at least one target design characteristic value of the target work based on the design data of the target work and a preset design rule;
 obtaining at least one existing design characteristic value of the existing work based on the design data of the existing work and the preset design rule; and
 comparing the at least one target design characteristic value with the at least one existing design characteristic value to obtain the target similarity;
distributing a copyright for the target work between the target copyright user and a copyright user corresponding to the existing work based on the target similarity; and
storing, in the first smart contract, copyright distribution data that specifies distribution of the copyright between the target copyright user and the copyright user corresponding to the existing work.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a node device of a blockchain network comprising a blockchain, a target transaction comprising design data of a target work and an identity of a target copyright user corresponding to the target work;
invoking a first smart contract that stores design data of an existing work;
in response to invoking the first smart contract, executing design similarity comparison logic and copyright distribution logic that are declared by the first smart contract;
in response to executing the design similarity comparison logic and the copyright distribution logic, comparing the design data of the target work with the design data of the existing work stored in the first smart contract to obtain a target similarity between the target work and the existing work, wherein comparing the design data of the target work with the design data of the existing work stored in the first smart contract to obtain the target similarity comprises:
 obtaining at least one target design characteristic value of the target work based on the design data of the target work and a preset design rule;
 obtaining at least one existing design characteristic value of the existing work based on the design data of the existing work and the preset design rule; and
 comparing the at least one target design characteristic value with the at least one existing design characteristic value to obtain the target similarity;
distributing a copyright for the target work between the target copyright user and a copyright user corresponding to the existing work based on the target similarity; and
storing, in the first smart contract, copyright distribution data that specifies distribution of the copyright between the target copyright user and the copyright user corresponding to the existing work.

12. The computer-implemented system of claim 11, wherein comparing the design data of the target work with the design data of the existing work stored in the first smart contract to obtain the target similarity comprises:
calculating, based on an unsupervised machine learning algorithm, a similarity between the design data of the target work and the design data of the existing work to obtain the target similarity.

13. The computer-implemented system of claim 11, wherein distributing the copyright for the target work between the target copyright user and the copyright user corresponding to the existing work based on the target similarity comprises:
- whenever the target similarity is greater than a preset threshold, distributing the copyright of the target work between the target copyright user and the copyright user corresponding to the existing work based on a preset ratio; and
- whenever the target similarity is less than the preset threshold, distributing an entirety of the copyright of the target work to the target copyright user.

14. The computer-implemented system of claim 11, wherein the operations comprise:
- receiving a target income transaction comprising a first quantity of virtual resources that a user provides for using the target work; and
- invoking the first smart contract;
- in response to invoking the first smart contract:
  - executing logic of virtual resource distribution based on the copyright distribution data stored by the first smart contract; and
  - distributing a second quantity of virtual resources to the target copyright user and the copyright user corresponding to the existing work based on the copyright distribution data.

15. The computer-implemented system of claim 14, wherein the virtual resources comprise digital assets circulated on the blockchain or digital tokens corresponding to off-chain assets.

16. The computer-implemented system of claim 14, wherein the first quantity is not less than the second quantity.

17. The computer-implemented system of claim 11, wherein the operations comprise:
- receiving a target income transaction comprising a first quantity of virtual resources that a user provides for using the target work; and
- invoking a second smart contract;
  - executing invoking logic of the first smart contract that is declared by the second smart contract; and
  - distributing a second quantity of virtual resources to the target copyright user and the copyright user corresponding to the existing work based on the copyright distribution data.

18. The computer-implemented system of claim 11, wherein:
- the blockchain network comprises a copyright distribution platform node device and a user client device;
- the copyright distribution platform node device communicates with the user client device;
- the blockchain is a consortium blockchain;
- the copyright distribution platform node device is a consortium member node device; and the target transaction is sent by the copyright distribution platform node device to a distributed database in the blockchain network.

\* \* \* \* \*